April 15, 1969 R. D. SMITH 3,438,434
SUBDIVIDED HEAT EXCHANGER TUBE BUNDLE ASSEMBLY PROVIDING
LONGITUDINALLY DISTRIBUTED FLUID BYPASS
AND DISTRIBUTING CHANNELS
Filed Oct. 19, 1967 Sheet 1 of 2
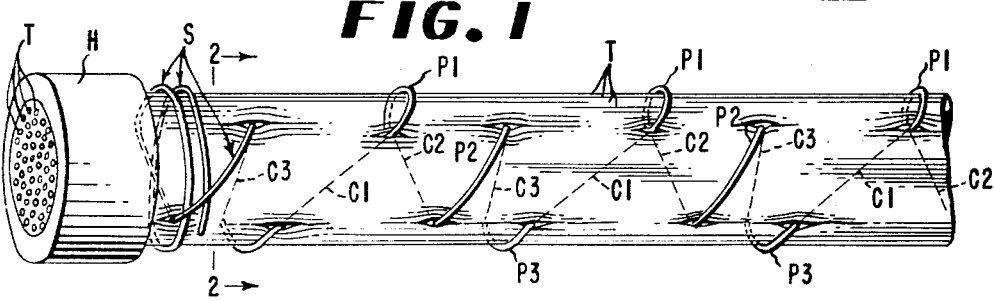
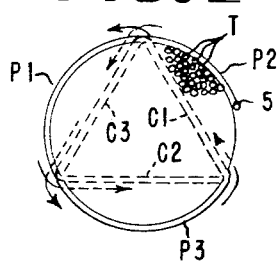
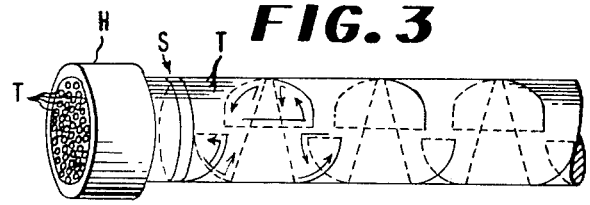
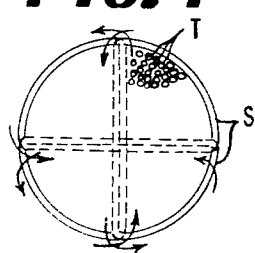
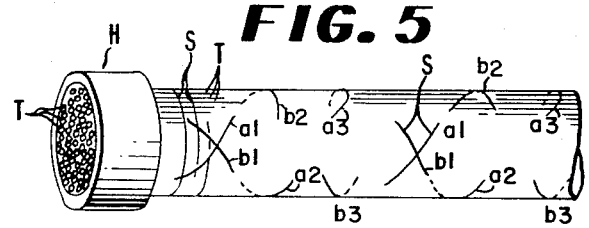
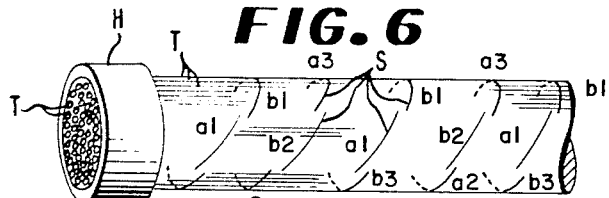
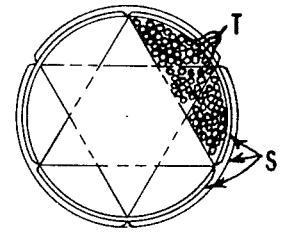
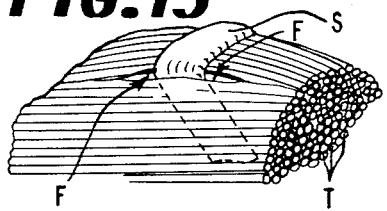
INVENTOR
ROBERT DILMAN SMITH
BY *Harry C. Braddock*
ATTORNEY

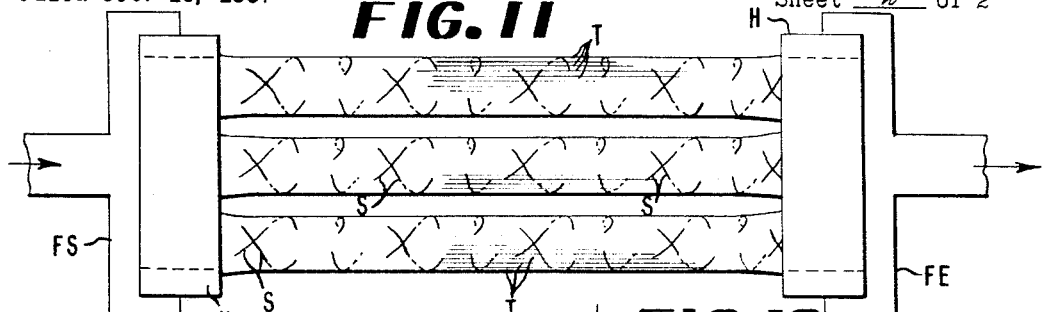
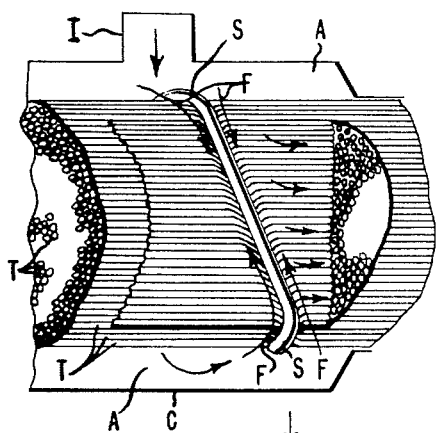
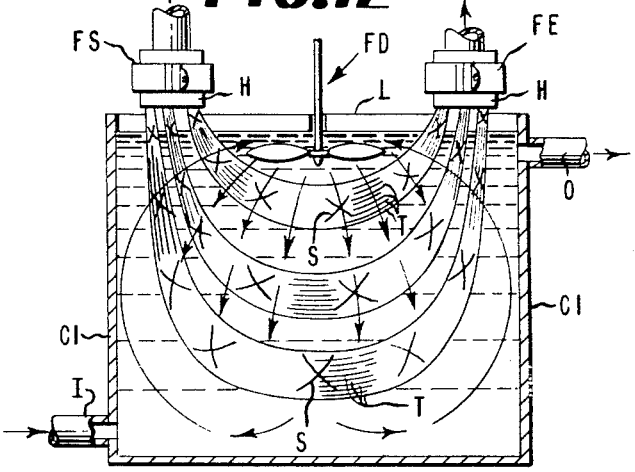
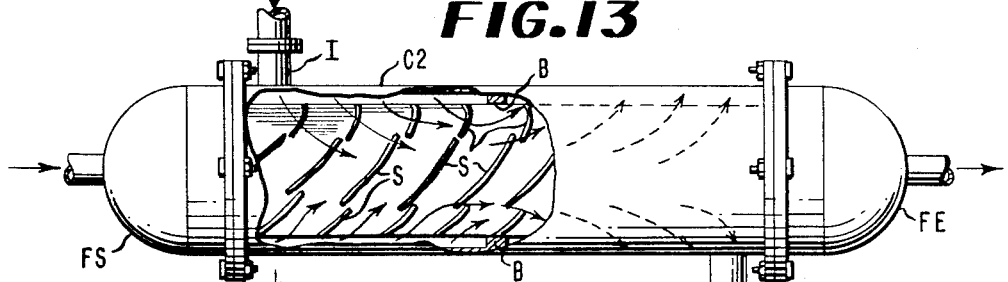
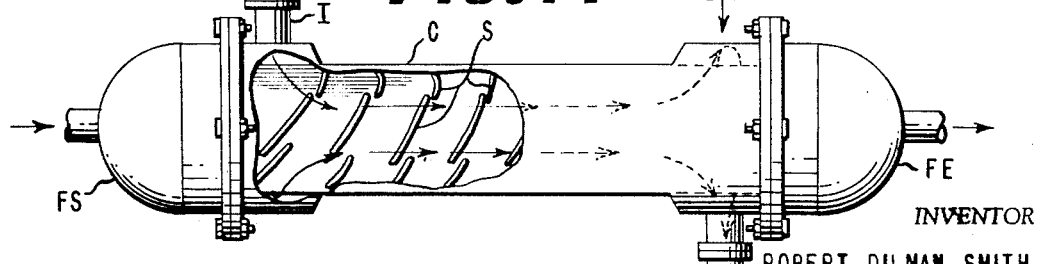

United States Patent Office 3,438,434
Patented Apr. 15, 1969

3,438,434
SUBDIVIDED HEAT EXCHANGER TUBE BUNDLE ASSEMBLY PROVIDING LONGITUDINALLY DISTRIBUTED FLUID BYPASS AND DISTRIBUTING CHANNELS
Robert Dilman Smith, Wilmington, Del., assignor to E. I. du Pont de Nemours and Company, Wilmington, Del., a corporation of Delaware
Filed Oct. 19, 1967, Ser. No. 676,571
Int. Cl. F28f 1/00
U.S. Cl. 165—158                                9 Claims

ABSTRACT OF THE DISCLOSURE

A heat exchange apparatus combination involving a tube bundle assembly of flexible plastic tubes with a given portion of the assembly being subjected to fluid flow having a significant component in a direction transverse to the tubes in the bundle, said given portion of the assembly of tubes being yieldably engaged by an elongated highly flexible hollow strand member interlaced transversely of the tubes in a pattern extending along the given portion of the assembly to maintain the portion in a substantially uniform compact transverse cross section and also subdividing the tubes of the given portion at a plurality of spaced positions along said portion into a plurality of groups of tubes separated sufficiently to form open spaced fluid bypass channels extending transversely through the given portion of the bundle in order to reduce the resistance of the portion to transverse flow and hence the forces exerted on the bundle due to such flow.

---

*Cross references to related applications and patents*

U.S. Patent 3,228,456 to Brown et al., filed Mar. 1, 1965, issued Jan. 11, 1966; U.S. Patent 3,277,959 to M. S. Withers, filed Aug. 12, 1964, issued Oct. 11, 1966; U.S. Patent 3,315,740 to M. S. Withers, filed Jan. 14, 1965, issued Apr. 25, 1967; application for U.S. patent, Ser. No. 598,070 to R. D. Smith, filed Nov. 30, 1966.

*Field of the invention*

This invention relates to the field of heat transfer or heat exchange, more specifically to heat exchange apparatus combinations utilizing flexible plastic tube elements and improved tube bundle assemblies for use in such combinations.

It is a general object of the invention to provide, novel and improved heat exchange apparatus combinations and tube element bundle assemblies which perform more effectively and more reliably by overcoming certain problems and disadvantages associated with earlier prior art heat exchange equipment utilizing flexible plastic tube elements, as will be described in detail hereinafter.

Other objects and advantages will be apparent from the following specication, claims, and accompanying drawings.

*Prior art background of the invention*

As indicated generally in U.S. Patent No. 3,228,456, heat exchange arrangements utilizing plastic tubular elements are known and have been found to be advantageous in many applications. Because of the use of small flexible plastic tubular elements, a number of problems have been encountered, not only in designing and producing such arrangements, but also in their operation. Some of these problems involve the relatively low heat transfer coefficients and the relatively high coefficients of thermal expansion possessed by most plastic materials as compared with parts made of more conventional materials such as metals. Other problems relate to the different properties such as compressive strength, tensile strength, flexibility, and melting points of these plastic materials relative to the other materials used. Production and operating techniques as well as apparatus designs must be established such that the more conventional parts such as those still formed of the usual metallic compositions can be shaped, formed, heated, and used while in cooperative association with the plastic parts to produce and operate economical, reliable, and effective heat exchange arrangements without destroying or damaging the associated plastic parts by application of excessive forces, impacts, temperatures, or other conditions.

One problem involves maintaining uniform packing and acceptable low resistance to fluid flow outside of the tubes of the tube bundle in plastic tube heat exchange apparatus. This, in turn, has been related to the flexible nature of the small plastic tubes used in this type heat exchanger apparatus and their reduced resistance to deformation relative to conventional materials such as the metals. The problem is aggravated at elevated operating temperatures at which considerable thermal expansion takes place and the tubes become even more flexible, limp, and deformable. A number of special structural features have been needed and used in the past to try to solve these problems. One of such features as disclosed in prior U.S. Patent No. 3,228,456 involves the use of transverse rigid baffle members through which the plastic tubular elements extend for lateral support. The baffle members also are needed to provide the desired fluid flow conditions exteriorly of the tubular elements. A second of such features as disclosed in prior U.S. Patent No. 3,277,959 involves the use of tape elements interleaved between the tube elements in spiral arrangements longitudinally spaced along a bundle of plastic tubular elements and bonded thereto. The tape elements position the tubular elements to a limited extent, maintain them in a somewhat compact bundle, and control, to some limited extent, fluid flow conditions exteriorly of the tubular elements in the bundle. A third feature of this type as disclosed in prior copending application Ser. No. 598,070 filed Nov. 30, 1966 in the name of Robert Dilman Smith involves placing a bundle of plastic tubular elements in a foraminous casing member or sleeve to maintain a compact outer bundle configuration and influence fluid flow conditions in the bundle exteriorly of said elements.

However certain problems and disadvantages have been discovered to be associated with each of the above prior art features. For example, threading the great multiplicity of small tubular elements through perforated transverse baffles as mentioned in the feature first mentioned is a prohibitive operation as to cost and time, and in addition does not prevent the squeezing together and spreading apart of the flexible tubular elements between the spaced transverse baffle members, which has an adverse effect on fluid flow conditions and on the tubular elements. It has also been observed that engagement of the deformable tubes or tube elements with rigid members, such as these baffles for example, has caused abrasion and damage to the tubes due to the tube motion under certain operating flow conditions.

As to the second feature mentioned above, the spaced tape elements bonded to the tubular elements, prevent bending of the bundles during production, and use and will break loose or damage the tubular elements if excessive bending forces are encountered. In addition, the tapes do not prevent undesirable squeezing together and spreading apart of the flexible tubular elements between the spaced tape elements which has an adverse effect on fluid flow conditions and on the tubular elements. The bonding of spaced tape elements to the tubular elements of a bundle is very costly and time consuming.

The addition of the third feature mentioned above, the foraminous casing or sleeve around a bundle of tubular elements, does reduce the spreading apart of the tubular elements but still requires spacing means such as the tape elements to maintain the desired spacing between the tubular elements. Squeezing together of the tubular elements between the tape element positions still occurs and this feature represents a costly, and not entirely successful, way to provide a compact bundle with uniform spacing and resistance to fluid flow through the bundle.

Further analysis and experience with the above-mentioned prior arrangements have indicated that certain other problems are present and unsolved in the general area of controlling resistance to fluid flow in the tube bundle and the pressure drop caused by such flow. It has been determined that particularly the problems of establishing fluid flow transverse to the flexible tubes of tube bundles could cause certain operating difficulties, especially at higher operating temperatures. For example, in certain types of heat exchange apparatus described above a bundle of tubes is positioned in a cylindrical casing so that an annular clearance exists between the outside of the bundle and the inside of the casing at least in the vicinity of the inlet and outlet of the casing, and the apparatus is provided with fluid flow directing structure, between the inlet and outlet, such as an annular baffle member, which forces fluid moving between the casing inlet and outlet to move into the bundle. This means that upstream of the flow directing structure, a baffle, and particularly in the space surrounding the bundle in the vicinity of the inlet, a large component of flow in the casing outside of the tubes is directed transversely of the tubes of the bundle radially inwardly of the bundle. Concurrently, downstream of the flow directing structure and particularly in the space surrounding the bundle in the vicinity of the outlet, a large component of flow in the casing outside of the tubes is directed transversely of the tubes of the bundle radially outwardly of the bundle. In certain of the prior art arrangements previously discussed, such fluid flow transversely of the tubes, especially when directed inwardly of the bundle, compressed and compacted the flexible tubes against each other toward the center of the bundle with sufficient force to cut off flow which could place the total driving pressure against the tubes. This condition is obviously undesirable due to the progressive radical increase in resistance to flow across, or transversely of the tubes. Under these conditions it is also possible that the tube bundle near the casing inlet or upstream of the directing means or baffle member would become inwardly impacted to an extent along the bundle that flow in the casing would bypass the bundle interior completely by reason of the increased space between the outside of the bundle and the inner dimensions of the casing and baffle member. In addition to the problems in the vicinity of the casing inlet or upstream of baffle members, even more undesirable conditions also could be created downstream of a baffle member or in the vicinity of the casing outlet where the transverse or radially outwardly directed flow would compress and compact the flexible tubes outwardly in an unbroken annular layer against the inside of the casing, again with sufficient force to cut off flow and possibly damage the tubes, particularly where they were forced across the casing outlet itself. However this general problem also exists wherever fluid is forced to flow simply laterally or transversely across almost any ordinary tube bundle in a single transverse direction. These problems have not been completely eliminated by the use of the features of the prior arrangements.

In order to achieve satisfactory, efficient, and competitive overall heat transfer ratings for heat exchanger apparatus of the type being discussed, sufficient fluid flow must be established around and relative to each tube in the bundle regardless of its position in the bundle.

The novel arrangements of this invention accomplish this result while avoiding the previously described problems encountered by arrangements of the prior art as discussed generally in the following section.

*Summary of the invention*

Generally stated, according to this invention, a tube bundle of flexible tubes which is subjected to significant flow across or transverse to its general longitudinal dimension, or the direction in which the tubes extend, is provided with means engaging the tubes and subdividing the bundle at each of a plurality of spaced positions along its length to form a plurality of groups of tubes at said positions, and laterally, or transversely, separating the groups sufficiently at said positions to form and maintain open fluid bypass channels extending transversely of the tubes and the bundle to substantially reduce the resistance to fluid flow transversely across the tube bundle and the forces on the tube due to such flow.

In the drawings:

FIGURE 1 is a partial side elevational view of a tube bundle assembly embodying features of the invention and showing one elongated strand member interlaced along the assembly in a preferred pattern.

FIGURE 2 is a general schematic transverse cross sectional view taken at line 2—2 of FIGURE 1 to indicate the appearance of the pattern of interlacing of the strand member.

FIGURE 3 is a larger scale simplified view similar to FIGURE 1 of a tube bundle assembly with a strand member interlaced along the assembly in a modified pattern.

FIGURE 4 is a larger scale simplified view similar to FIGURE 2 showing the end view of the strand member interlacing pattern of FIGURE 3.

FIGURE 5 is a larger scale simplified view similar to FIGURE 3 of a tube bundle assembly with two strand members interlaced along the assembly, each following the general pattern of FIGURE 1.

FIGURE 6 is a view similar to FIGURE 5 showing two strand members interlaced in a different way along the tube bundle assembly yet each following the preferred general pattern of FIGURE 1.

FIGURE 7 is a view similar to FIGURE 6 showing the strand members interlaced in a preferred arrangement.

FIGURE 8 is a view similar to that of FIGURES 2 and 4, showing the end of the interlacing pattern of FIGURE 7.

FIGURE 9 is an enlarged partial transverse cross sectional view of a tube bundle assembly similar to that of FIGURE 3 showing the preferred flattened tubular cross section of the stand member.

FIGURE 10 is an enlarged partial perspective view of a portion of a tube bundle assembly similar to that shown in FIGURE 1 with a portion of the tubes broken away to show more clearly the engagement of the elongated strand member with the other tubes in forming the transverse channels which reduce resistance to transverse flow and distribute fluid throughout the assembly cross section.

FIGURE 11 is a general side elevational view of a tube bundle assembly embodying principles of the invention and provided with a plurality of bundles of tubes each joined to the same header units at the ends thereof, each bundle being engaged by a strand member.

FIGURE 12 is a general schematic vertical cross-sectional view of a heat exchange apparatus combination embodying features of the invention and provided with a tube bundle assembly similar to that of FIGURE 11 except that the individual bundles are of different lengths for improved positioning in a tank having an agitator type flow directory means.

FIGURE 13 is a general somewhat schematic vertical cross-sectional view of a heat exchange apparatus combination embodying features of the invention showing the general fluid flow patterns and giving an idea as to how the transverse channels formed by the interlaced strand can reduce the resistance of the tube bundle assembly to transverse flow.

FIGURE 14 is a view similar to FIGURE 13 of a modified heat exchange apparatus combination embodying principles of the invention.

FIGURE 15 is an enlarged partial perspective view of a preferred strand member engaging the peripheral tubes of a tube bundle assembly to form transverse flow channels through the assembly.

A preferred embodiment of a heat exchanger tube bundle assembly according to the present invention is shown in FIGURES 1 and 2. Only one end of the assembly is shown, the other end being substantially the same in all respects. The assembly as shown in FIGURE 1 comprises a plurality of flexible tubular elements T generally extending in the same direction and laterally positioned to form a bundle. The bundle in FIGURE 1 is shown as cylindrical with a substantially circular transverse cross section. The tubular elements T at each end of the bundle are bonded to each other and to the interior surface of an annular header unit, or member, H in a suitable manner so that the header members may be operatively connected one to a fluid supply means FS and the other to a fluid exhaust means FE as shown generally and schematically in FIGURES 11, 12, 13, and 14. Preferred examples of the arrangements for bonding the tubular elements T to each other and to the header members H are disclosed in U.S. Patent No. 3,315,740 mentioned above. Preferred examples of arrangements for combining the header members with fluid supply means and fluid exhaust means are disclosed in U.S. Patent No. 3,277,959 mentioned above. Suitable materials of which the tubular elements may be formed and suitable sizes of the elements are disclosed in U.S. Patents 3,228,456; 3,277,959; and 3,315,740, a preferred composition at the present time being a polyfluorinated plastic such as a copolymer of tetrafluoroethylene and hexafluoropropylene. The flexible tubular elements of the bundle assembly preferably are in a size range between about 5 and 275 mils outside diameter with a wall thickness between about 0.5 and about 30.0 mils. However it is believed to be clear to those of ordinary skill in the art involved that other materials and dimensions could be utilized without departing from the spirit of the invention. Many other organic and partly organic polymeric compositions could be used so long as they were readily fabricatable, possessed suitable compatibility with the fluids to be handled, possessed adequate properties such as strength at the desired operating conditions, and further possessed adequate thermal conductivity for the intended use. By the term organic polymeric material is meant any polymeric composition having a significant proportion by weight or volume of constituents known as organic. A significant proportion is considered to be that proportion which is sufficient to produce, in tube elements made of the material, properties suitable for the disclosed use in heat exchange or heat transfer.

Referring again to FIGURES 1 and 2, tube element positioning means comprising at least one elongated strand member S is shown engaging the tubular elements T of the bundle and interlaced transversely of said tubes in a substantially regular repeating pattern extending along the bundle as shown. In the pattern shown in these figures, the strand member S proceeds around the periphery of the tube bundle in an arcuate path PI of about 120° as viewed from the end of the bundle as shown in FIGURE 2. The strand member then proceeds into the tube bundle between the tubes in a chordal path C2 and emerges from the bundle to proceed around the periphery of the bundle in a second arcuate path P2 of about 120°. The strand member then proceeds again into the tube bundle between the tubes in a second chordal path C3 and emerges from the bundle again to proceed again around the periphery of the bundle in a third arcuate path P3 of 120°. From P3 the strand member proceeds again into the bundle between the tubes in a third chordal path C1 and emerges from the bundle to repeat the pattern as shown.

The strand member S is secured preferably at its ends by suitable means to maintain the desired degree of tension in the strand member. An example of such suitable means is shown in FIGURE 1 where the end of the strand member is formed into a double loop around the bundle and tucked under the first arcuate portion of the strand member. If desired the strand member could be further secured by heat bonding to itself or other structure such as header member H. Sufficient tension is maintained in the strand member S to maintain the member in yieldable engagement with the tubes which will cause transverse open fluid flow channels F to be formed, as shown in FIGURES 10 and 15, at spaced positions along the tube bundle assembly. This engagement of the strand member with the tubular elements also has the effect of maintaining the bundle in a compact coherent configuration, preferably with its transverse cross section substantially constant along its length. In addition the tube bundle assembly is subdivided into a plurality of compact groups of tube elements at spaced positions along its length, it being the lateral spacing between these groups of tube elements which forms the transverse fluid flow channels across the bundle.

The strand member S may be formed of a flexible material compatible with the material of which the tube elements are formed and having other desired properties sufficient to carry out its intended function. Preferably strand member S is formed of the same material as the tubular elements and comprises a flattened hollow transverse cross section of about the same dimensions as the tube elements themselves. The hollow cross section or tubular aspects of the preferred strand member, being laterally deformable, provides a cushioning, somewhat resilient yielding engagement with the tube elements to minimize abrasion and wear. The transverse cross section also may be significantly flattened when the strand member is in place to provide a somewhat streamlined profile of reduced resistance to fluid flow along the direction of the tubes (FIGURES 9 and 15). It is believed to be clear that the tube positioning means may also comprise a plurality of individual strand members interlaced at spaced positions along the tube bundle assembly and suitably secured in position to achieve the desired effect.

Other interlacing patterns may be used in the strand member S in addition to that shown in FIGURE 1. For example, in FIGURES 3 and 4 a pattern is illustrated in which a strand member proceeds along the tube bundle by alternately moving around 90° peripheral portions and moving through the bundle along a central or a diametral path as viewed from the end of the bundle in FIGURE 4.

In FIGURE 5 a tube bundle assembly is shown provided with two strand members each interlaced in the same pattern as shown in FIGURE 1 but each proceeding around the bundle in the opposite direction as viewed from the end.

FIGURE 6 illustrates a tube bundle assembly provided with two strand members each interlaced in the same pattern as shown in FIGURE 1 and each proceeding around the bundle in the same direction, as viewed from the end, but one of the patterns being circumferentially offset or staggered with respect to the other by 120°.

FIGURE 7 shows a preferred tube bundle assembly provided with two strand members each interlaced in the same pattern as shown in FIGURE 1 and each proceeding around the bundle in the same direction as viewed from the end, but one of the patterns being circumferentially offset, or staggered, with respect to the other to give the end view pattern as seen in FIGURE 8.

The interlacing of the strand members along a tube bundle assembly may be accomplished by any suitable means. The interlacing has been satisfactorily accomplished by direct manual procedures using an enlarged needle or hooked element to penetrate the tube bundle and pull the strand members through as is done in ordinary hand sewing techniques. The strand member patterns are maintaind by suitably securing portions of the strand member, preferably the end portions thereof against movement relative to the bundle as has been discussed previously. The interlacing of the strand members can be easily acomplished on prior art bundles such as those fabricated using the spiral tapes as disclosed in the above-mentioned U.S. Patent No. 3,277,959, as well as on newly-produced tube bundles without tapes.

The tube element bundle assemblies of this invention may take a variety of forms and be used in a number of ways.

FIGURE 11 shows a plurality of tube elements T joined to two header units H as previously described, but divided into a number of sub-bundles, each of which are further subdivided into smaller groups by use of strand member tube positioning means of this invention.

FIGURE 12 shows a heat exchanger apparatus combination utilizing a tube bundle assembly similar to that of FIGURE 11 but provided with sub-bundles of varying lengths. This combination comprises a casing or housing CI provided with a fluid inlet I, a fluid outlet O, and a fluid flow directing means such as an agitator FD. The tube bundle assembly, which is connected to a fluid supply means FS and a fluid exhaust means FE as shown schematically, is positioned in a fluid contained in the casing in such a way that agitator FD causes the flow patterns as indicated by the arrows in FIGURE 12 in the fluid in the casing. As shown, a substantial component of this flow is transverse to the tube elements and the tube element bundle assembly. In such an end use environment the interlaced strand members function to maintain stable bundle and sub-bundle configurations, which are desirable; and in addition they function to provide the transverse flow or bypass channels which aid in distributing the fluid throughout the tubes of the bundle, and which channels also reduce the resistance to transverse flow and hence the forces applied to the bundles by such flow. These are also highly desirable and beneficial functions in preventing damage to the tubes and improving their performance in transfer of heat.

FIGURE 13 shows a heat exchange apparatus combination using a tube bundle assembly with features as shown in FIGURES 1 and 6. This combination comprises a cylindrical casing member C with inlet I, outlet O, and fluid flow directing means such as annular baffle member B. A tube bundle assembly is shown positioned in the casing member C with its periphery engaged by baffle element B and operatively connected at its end portions to header arrangements (fluid supply means FS and fluid exhaust means FE) as shown. The general direction of fluid flow is shown by the arrows indicating general transverse movement of fluid from inlet I into the bundle assembly upstream of baffle member B, and general transverse movement of fluid out of the bundle and out of outlet O downstream of this baffle member. As is believed clear from the previous discussions and the enlarged showing of FIGURES 10 and 15, the tube positioning means comprising at least one strand member not only maintains a stable bundle configuration which expedites assembly and replacement of bundle assemblies; but also, by formation of the transverse flow channels subdividing the bundle assembly, improves distribution of fluid into and out of the bundle, and further, decreases the resistance of the bundle assembly to transverse flow. The transverse flow channels, by providing bypass routes through the tube bundle assembly upstream and downstream of the baffle member B or flow directing means, prevents undue compaction, or impaction, inwardly of the tubes of the bundle upstream of the baffle member and undue compaction or impaction of the tubes of the bundle in an outward direction downstream of the baffle member. This means that the chances of the shutting off or blocking of flow exteriorly of the tube elements in the casing member C, and damage to the tube elements themselves, especially in the space downstream of the baffle member, are greatly reduced if not eliminated.

FIGURE 10 shows in more detail the formation of the transverse channels and their flow distribution function in the area of greatest transverse flow near the inlet I and in the enlarged annular portion of casing C adjacent the inlet.

FIGURE 14 shows a heat exchanger apparatus combination similar to that of FIGURE 13 except that a modified casing member is utilized, one which has the flow directing means integrally formed therein in a somewhat analogous arrangement to the baffle member B of FIGURE 13. The functioning of the improved tube bundle assembly is essentially the same in the arrangements of both FIGURES 13 and 14.

It has been demonstrated that heat exchanger apparatus combinations with tube bundle assemblies embodying principles of this invention have significantly improved heat transfer characteristics due to improved fluid distribution throughout the tube bundle assemblies which is related to the significantly reduced resistance to fluid flow across the bundle assemblies in a direction transverse to the tubes. In addition, the problems of flow cut-off and damage to the tube elements themselves because of compaction or impaction of the tube elements against themselves in unbroken continuous layers as discussed herein, have been overcome or eliminated by the beneficial bypass action of the transverse channels.

It is believed to be clear that improved heat exchange apparatus combinations and tube bundle assemblies have been provided in accordance with the objects of the invention.

Although certain preferred embodiments of the invention have been described in detail in accordance with the patent statutes, many other modifications and variations within the spirit of the invention will occur to those skilled in the art, and all such are considered to fall within the scope of the following claims.

What is claimed is:

1. An improved heat exchanger tube element bundle assembly, said assembly comprising in combination, a plurality of elongated small diameter, thin-walled flexible tube elements, said elements formed of a polymeric composition having a significant proportion of organic constituents, said tube elements having first end portions and second end portions, said first end portions joined to a first header unit for operative connection with a fluid supply means, said second end portions joined to a second header unit for operative connection to a fluid exhaust means, tube element positioning means engaging and subdividing said plurality of tube elements at each of a plurality of spaced positions between said tube element end portions to form a plurality of compact groups of tube elements at said spaced positions, said positioning means circumferentially restraining said groups to maintain their compact cross sections and transversely separating said groups at said spaced positions sufficiently to maintain open fluid flow channels extending transversely of said tube elements and thereby reduce both the resistance to fluid flow transversely across said plurality of tube elements and the forces on said elements due to such fluid flow.

2. The improved assembly of claim 1 in which said positioning means comprises one or more elongated strand members interlaced transversely of said plurality of tube elements in a substantially regular pattern extending substantially uniformly along the plurality of tube elements between the end portions of said elements, each member having its end portions operatively secured in position relative to said plurality of tube elements to maintain sufficient tension in said member to keep the groups of tube elements in their subdivided spaced condition at said plurality of spaced positions.

3. The improved assembly of claim 2 in which each said strand member comprises an elongated, laterally deformable, tubular structure formed of polymeric composition having a significant proportion of organic constituents, said strand member resiliently engaging tubular elements of said plurality to maintain said groups of elements in a coherent assembly of substantially constant transverse cross section between said end portions.

4. The improved assembly of claim 3 in which said tubular structure is significantly flattened in its transverse cross-section to present reduced resistance to fluid flow along the elongated dimension of said tube elements.

5. An improved heat exchanger apparatus comprising in combination; a casing member, said casing member provided with structure defining a fluid-containing chamber, said apparatus further comprising a bundle of elongated small diameter thin-walled flexible tubular elements having continuously hollow interiors and formed of a polymeric composition having a significant proportion of organic constituents, said bundle extending through at least a portion of said chamber to coperate with a fluid contained in said chamber, fluid conduit means operatively connected with the interiors of said tubular elements to circulate a fluid therethrough and establish a heat transfer relationship with a fluid in said chamber, flow-directing means in said casing member cooperating with said bundle to cause fluid flow across at least a given portion of said bundle said flow having at least a significant component in a direction transverse to the direction in which said tubular elements extend, said apparatus further comprising tubular element positioning means engaging said tubular elements of said bundle along at least said given portion of said bundle to maintain said given portion of a substantially uniform and compact overall transverse cross section and to provide, at a plurality of spaced positions along said given portion of said bundle, transverse fluid flow bypass channels extending through said portion of said bundle and subdividing said portion of said bundle at said positions into smaller groups of tubular elements in order to reduce the resistance to fluid flow across said bundle in said transverse direction and reduce the forces in said tubular elements due to such fluid flow.

6. The improved apparatus of claim 5 in which said tubular element positioning means comprises one or more elongated strand members interlaced transversely of said portion of said bundle in a substantially regular pattern extending substantially uniformly along said portion, each member being operatively secured in position relative to said portion of said bundle to maintain sufficient tension in said member to maintain said channels and maintain said portion of said bundle in its subdivided condition at said spaced positions.

7. The improved apparatus of claim 6 in which each said strand member comprises an elongated, laterally deformable tubular sturcture formed of an organic polymeric composition having a significant proportion of organic constituents, said strand member resiliently engaging said tubular elements of said bundle to maintain them in a coherent assembly.

8. The improved apparatus of claim 7 in which said tubular structure is significantly flattened in its transverse cross section to present reduced resistance to fluid flow along the elongated dimension of said tubular elements.

9. An improved tube bundle assembly for heat exchanger apparatus, said assembly comprising in combination a plurality of elongated small diameter, thin-walled relatively highly flexible tubes, said tubes having first end portions joined to a first header member for operative connection with a fluid supply means, said second end portions joined to a second header member for operative connection with a fluid exhaust means, an elongated relatively highly flexible hollow strand member laterally yieldably engaging said tubes and interlaced transversely of said tubes in a substantially regular repeating pattern extending along the plurality of tubes between the end portions thereof to maintain said plurality of tubes in a substantially uniform and compact overall transverse cross section between said tube end portions and further to subdivide said plurality of tubes at each of a plurality of spaced positions between the tube end portions to form a plurality of groups of tubes at said spaced positions, said strand member transversely separating said groups at said spaced positions sufficiently to maintain open fluid flow channels extending transversely of said tubes in order to reduce the resistance to transverse fluid flow across said plurality of tubes and to reduce the forces on said assembly due to such flow, said strand member having portions thereof operatively secured in position relative to said tube elements to establish sufficient tension in said strand member to maintain the group of tubes in their subdivided spaced condition during conditions of said transverse fluid flow.

References Cited
UNITED STATES PATENTS 3,363,680  1/1968  Baker _____ 165—180

ROBERT A. O'LEARY, *Primary Examiner.*

ALBERT W. DAVIS, *Assistant Examiner.*

U.S. Cl. X.R.

165—159, 162, 178, 109, 175